April 7, 1953  C. J. ULRICH  2,634,000
HOISTING APPARATUS
Filed April 28, 1947 6 Sheets-Sheet 1

INVENTOR.
Charles J. Ulrich
BY
ATTORNEY

April 7, 1953 C. J. ULRICH 2,634,000
HOISTING APPARATUS
Filed April 28, 1947 6 Sheets-Sheet 2

INVENTOR.
Charles J. Ulrich
BY
ATTORNEY

April 7, 1953

C. J. ULRICH 2,634,000

HOISTING APPARATUS

Filed April 28, 1947

INVENTOR.
Charles J. Ulrich
BY
ATTORNEY

April 7, 1953  C. J. ULRICH  2,634,000
HOISTING APPARATUS
Filed April 28, 1947  6 Sheets-Sheet 4

INVENTOR.
Charles J. Ulrich
BY
ATTORNEY

April 7, 1953 C. J. ULRICH 2,634,000
HOISTING APPARATUS
Filed April 28, 1947 6 Sheets-Sheet 6

Patented Apr. 7, 1953

2,634,000

UNITED STATES PATENT OFFICE 2,634,000

HOISTING APPARATUS

Charles J. Ulrich, Los Angeles, Calif.

Application April 28, 1947, Serial No. 744,330

17 Claims. (Cl. 214—1)

This invention relates generally to hoisting mechanisms, and pertains particularly to a hoisting unit which is adapted to directly engage the load which is being hoisted, and to raise with the load in the hoisting operation. As specifically disclosed herein by way of example, the device of this invention is adapted to be employed in connection with an aircraft, as in loading operations, where the attributes of light weight, ready convertibility for the handling of objects of differing sizes, and speed of operation are considered important. The accompanying description is directed to a device adapted particularly for use in bomb hoisting, and the adaptability of the invention to other uses will be apparent to those familiar with the art to which it broadly appertains.

A particular object of the invention is to provide a power driven hoisting device adapted to engage the load to be hoisted, and comprising a pair of rotatable hoisting members adapted to engage upon statically supported flexible hoisting lines, and, by reaction upon said hoisting lines, to raise and/or lower with the load upon rotation of said hoisting members.

A further important object is to provide a device of the above character, in which the rotatable hoisting members are adapted for removable attachment to or engagement upon the flexible hoisting lines.

One of the particular objects of the invention, as attained in a preferred embodiment, is to provide a hoisting device which is provided with self-contained hoisting drums and means defining a platform on which the load is adapted to be carried, in which the free ends of the cables carried by the hoisting drums are adapted to be attached to the structure with respect to which the hoisting operation is to be effected.

A further object of the invention is to provide a hoisting device carrying a pair of hoisting drums adapted for disposition in a symmetrical relation to the load being hoisted, each of the drums being adapted to engage a loop of cable which is attached at its ends to the structure with respect to which the hoisting operation is to be effected, such cable loops being readily disengageable from the drums so as to permit ready removal of the hoisting device from the hoisting location, without requiring that the cables be separated from the structure.

A further object of the invention is to provide a hoisting device adapted particularly for use in the hoisting of bombs and the like, which is adapted to accommodate bombs of varied external diameter.

A further object of the invention is to provide a device of the character described provided with a pair of hoisting drums which are intergeared for coincident operation, in which separate driving motors are provided for the respective drums. As a further object in this particular connection, I preferably arrange the driving motors interiorly of the drums, with a resulting saving in the overall dimensions of the device.

A still further object of the invention is to provide a bomb hoisting device which is simple in construction and operation, adapted for rapid operation whereby bomb loading may be expedited, and is of sufficiently light weight and general compactness to render it adaptable to transportation in the aircraft as part of its normal complement of equipment.

Other objects and features of the invention will be brought out in the ensuing description of a preferred embodiment thereof as illustrated in the accompanying drawings, or will be apparent from such description. Referring to the drawings:

Figure 1:
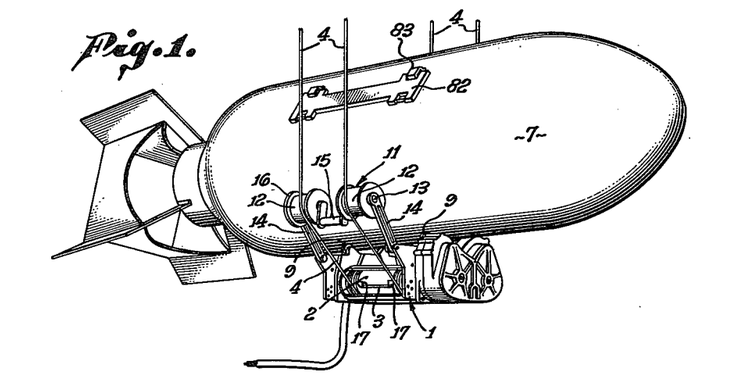
Fig. 1 is a three-quarter perspective view showing a preferred embodiment of my invention in its role as a bomb-hoist.
Figure 2:
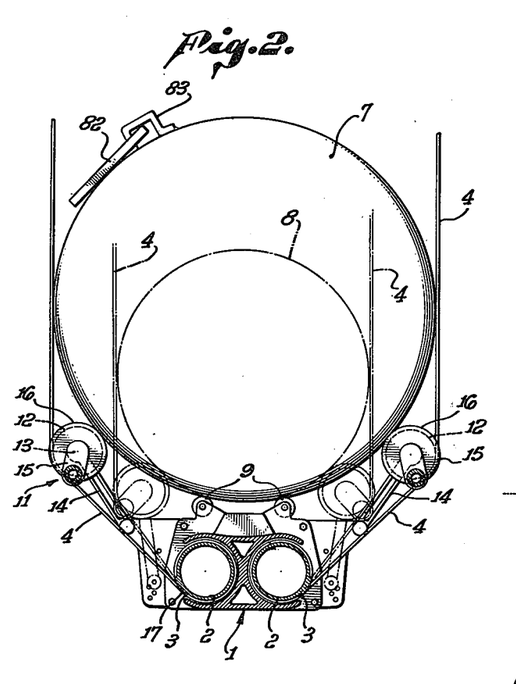
Fig. 2 is a transverse sectional view thereof showing the adaptability of the device to the hoisting of bombs of differing diameter.
Figure 3:
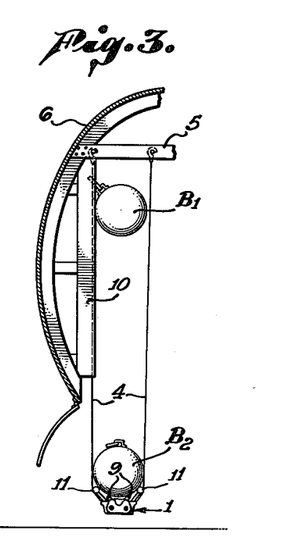
Fig. 3 is a fragmentary representation of one side of an aircraft fuselage showing the manner in which a bomb is hoisted.

Referring particularly to Figs. 1 to 3 of the drawings, the device is seen to comprise a framework 1 carrying a pair of rotatable drums 2 adapted to engage associated statically supported flexible hoisting line means, such as upon a loop 3 of each of an opposed pair of cables 4 which are attached at their free ends to a suitable relatively fixed portion of the structure with respect to which the hoisting operation is to be conducted, such as a cross member 5 forming a part of an aircraft fuselage 6. As shown more particularly in Fig. 2, the device is adapted to receive bombs of differing diameters, the relative sizes of a 2,000 pound bomb and a 500 pound bomb being indicated in full lines at 7 and in dot-dash lines at 8, by way of example. I preferably provide a pair of supporting feet at each end of the housing 1, as at 9, to define a platform structure to supportingly engage the load represented by the bomb. For reasons hereinafter brought out, such supporting feet are preferably in the form of rollers, so that the bomb may be rotated while being hoisted or after it has been raised to a desired elevation within the fuselage structure, to facilitate attachment of the bomb in its bomb rack, indicated at 10 in Fig. 3.

In order to insure that the cables 4 will not interfere with the free rotation of the bomb, I preferably provide idling rollers at the lateral sides of the framework 1, over which the cables may be passed, and these idling rollers are preferably carried on supporting means which may be located at various positions with respect to the framework so as to accommodate bombs of different transverse dimensions. Such a roller structure is illustrated generally at 11, and may comprise a roller member 12 for each of the cable runs, such roller member being mounted for free rotation on a spindle 13 supported by an attachment arm 14 which is detachably secured to the side of the framework 1 at the adjacent end of the framework. The respective spindles for the rollers 12 at one side of the structure are preferably maintained in aligned relationship, and in view of the fact that with some types of bombs it is required that allowance be made for full rotation of the bomb even though the bomb may be provided with projecting lugs, I preferably provide for clearance of such lugs as by an offset 15 connecting the spindles 13. The cables 4 will roll over the rollers 12 in the operation of the drums 2, and in order to provide for maintaining the rollers 12 out of contact with the bomb I preferably provide collars or washers 16 of greater diameter than the rollers 12, which are located at the respective axial ends of the rollers and also freely rotatable on the spindles 13. As a specific illustration of the assembly of the rollers 12 and collars 16 on the spindle 13, reference is made to the broken-away showing thereof in Fig. 4, wherein the collar 16 is shown as rotatably disposed on the spindle 13 through a needle bearing 16a, such collar being provided with an inwardly directed hub portion 16b adapted to support a ball bearing 12a to carry the roller 12. The roller 12 and the collar 16 may be provided with a groove and tongue dust seal as at 12b if desired.

I preferably provide shoulder means 17 arranged at opposite ends of a medial section of the drum periphery which are adapted to receive the loop 3 of the cables 4 and engage the same upon rotation of the drums 2 in a direction such as to raise the hoist, and helical grooves 18 and 19 extending from the shoulder means towards adjacent ends of each drum, the helical grooves being of opposite hand. The shoulder means 17 may be and preferably are aligned in an axial direction. The cable 4 is adapted to be carried within the helical grooves 18 and 19 as the cable is wound upon the drum in operation of the device.

Figure 5:
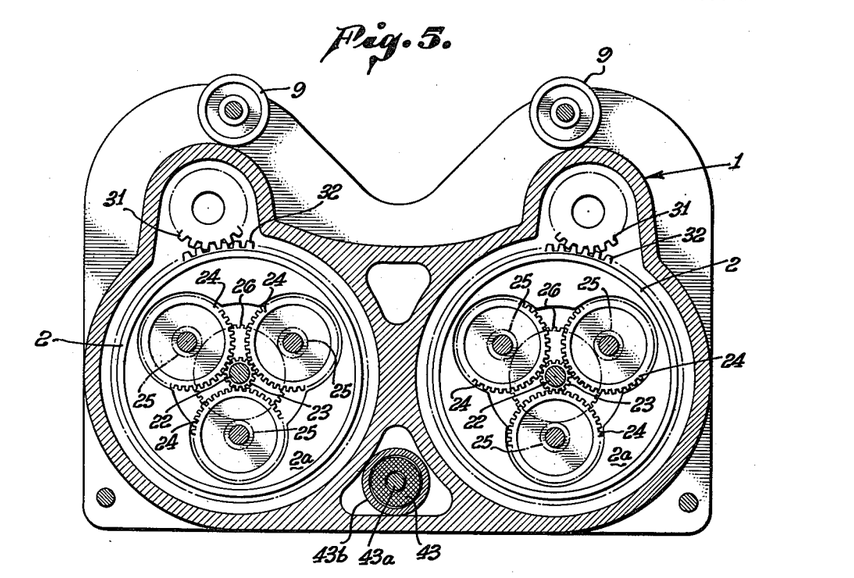
Fig. 5 is a transverse sectional detail as taken on line 5—5 in Fig. 4.
Figure 6:
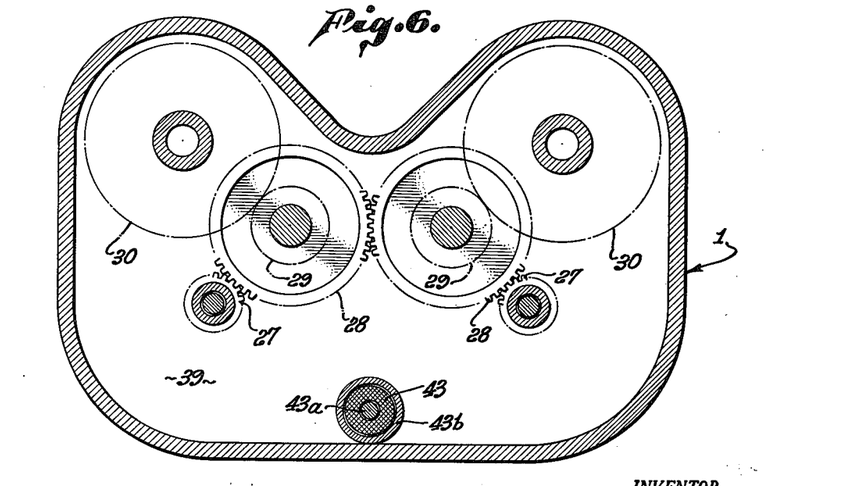
Fig. 6 is a view corresponding to Fig. 5, taken on line 6—6 in Fig. 4.

Within each of the drums 2 I provide a motor 20 which is adapted to effect rotation of the drum, the field structure being adapted to ride with the drum, for example, and the armature being provided with a drive shaft 21. The shaft 21 is keyed to a shaft 22 provided with a spur gear 23 (Figs. 4 and 5) meshing with a group of reduction gears 24 journaled in the head 2a of the drum 2 carrying smaller pinions 25 meshing with a second reduction gear 26 coaxial with the gear 23 and carrying a pinion gear 27 (Fig. 6). The gear 27 meshes with a third reduction gear 28 journaled in the framework 1 and carrying a pinion 29 meshing with a fourth reduction gear 30 also journaled in the framework 1 and carrying a pinion 31 meshing with a drive gear 32 mounted coaxially upon the drum head 2a. The particular arrangement of gears illustrated provides in the neighborhood of a 275:1 reduction from the shaft 21 to the drum 2, and it will be appreciated that a high gear ratio on this order is employed particularly for aircraft use in order to effect a weight saving, inasmuch as it makes it possible to employ a motor 20 of high speed characteristics to secure the amount of power necessary to lift a rather heavy load. The various bearings for the gears and pinions 23 through 31 may be of the "needle," ball, or roller type, as desired.

Figures 4, 7:
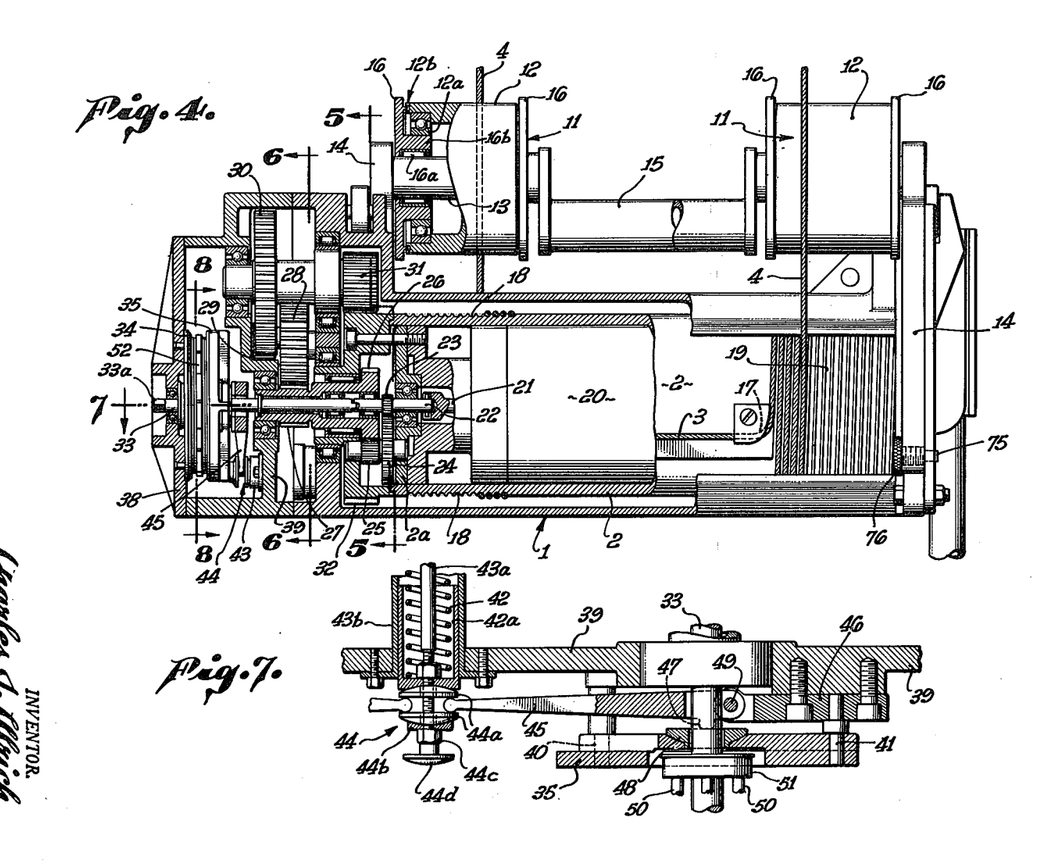
Fig. 4 is a partly sectional longitudinal view of the hoist of Fig. 1 showing the gear reduction end of one of the hoisting drums in section, and the balance of the structure in elevation.
Fig. 7 is a fragmentary view in plan section taken on the plane of and at the approximate location of the dot-dash reference line 7 in Fig. 4, illustrating a portion of the control means for the brake assembly which is provided for each of the hoisting drum motors.

Braking means are preferably provided in order to hold the device at any desired level, and this braking means is preferably electrically integrated with the motors 20 so as to be released whenever the motors 20 are energized. This braking means is preferably applied to the motor shaft, as to a shaft 33 which is keyed to and is coaxial with a shaft 22, which is in turn coaxial with and keyed to the motor shaft 21. The braking means which I have employed in my construction is illustrated in elevation at the left end of Fig. 4 and in Figs. 7 through 11, and may comprise a pair of spaced braking plates 34 and 35 fixed relative to the shaft 33, against which friction plates 36 and 37, rotatable with the shaft 33, are adapted to coact. The braking plate 34 may be fixedly attached to an outer plate member 38 forming the left-hand end of the framework 1 as seen in Fig. 4, and the braking plate 35 may be carried upon an intermediate wall member 39 which forms a cover plate for the space within which the reduction gear assembly is mounted, as upon studs 40 and 41 (Fig. 7). One of the braking plates 34—35 is movable with respect to the other braking plate and with respect to the friction plates 36 and 37, and is for this reason preferably slidably mounted on the studs 40 and 41.

Figures 12, 13, 14:
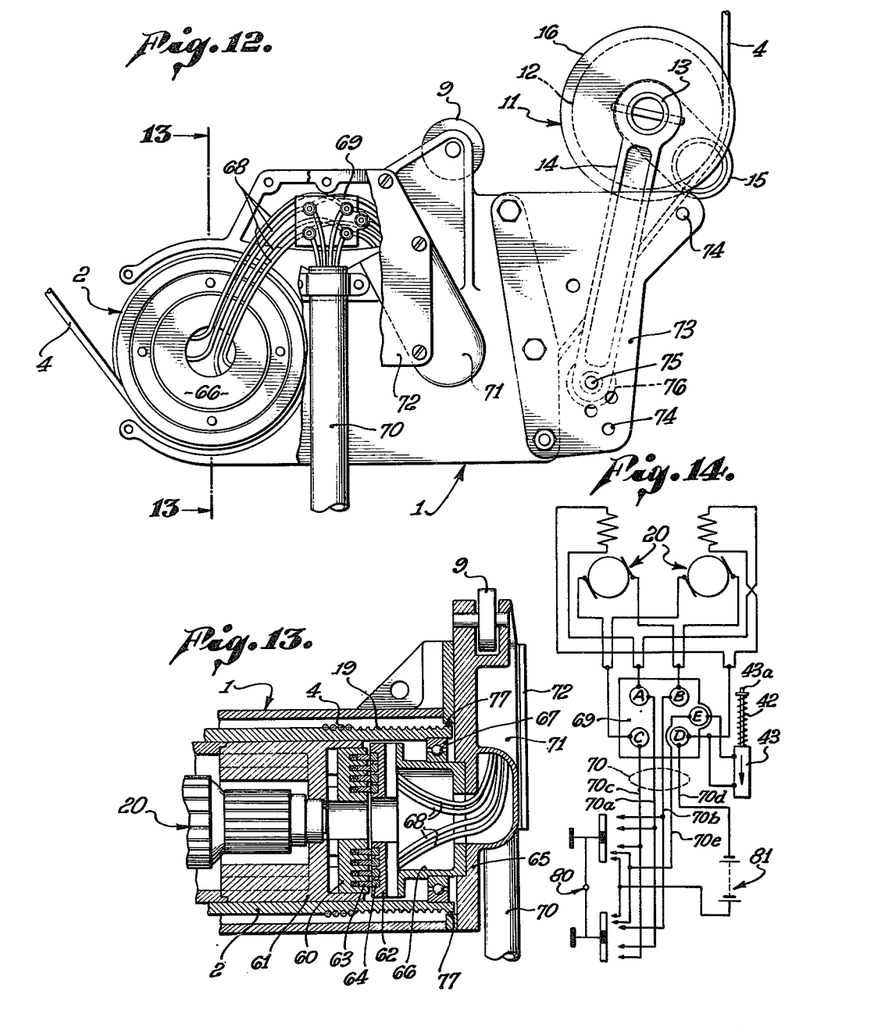
Fig. 12 is a fragmentary view of the right-hand end of the structure as illustrated in Fig. 4, showing the end of the housing broken away at one side to illustrate the rear end of the drum motor assembly.
Fig. 13 is a fragmentary sectional view as taken on line 13—13 in Fig. 12.
Fig. 14 is a schematic circuit diagram, showing an electrical control arrangement which may be employed in connection with the preferred form of this invention.

The means for moving the braking plate 35 in a direction toward the braking plate 34 may comprise a spring 42 associated with a solenoid 43 (see Fig. 14). The spring 42 may be disposed about the armature rod 43a of the solenoid 43, and is adapted to compressively engage upon a cup 42a slidably mounted within the casing 43b of the solenoid 43 which may be carried upon the intermediate wall member 39. The armature rod 43a is attached to the cup 42a, and extends therethrough to carry a spherically surfaced compensating thrust assembly 44 adapted to engage with an arm 45 pivotally secured with respect to the framework 1 adjacent the position of the shaft 33, as upon a support bracket 46 secured to the intermediate wall member 39, this support bracket conveniently carrying the stud 41, above mentioned. The arm 45 is preferably provided with a pair of radially-disposed thrust pads 47 straddling the shaft 33 and adapted to engage a spherically surfaced compensating thrust collar 48 bearing upon a spherical socket in the rearward face of the braking plate 35.

The compensating thrust assembly 44 may comprise a pair of plano-convex plates 44a having their plano faces engaging the end portions of the arms 45 and convex surfaces directed away from each other and respectively engaging a spherical seat in the outer end of the cup 42a and in a thrust washer 44b, which latter is held in spaced relation to the cup 42a by a lock nut 44c. The lock nut preferably terminates in a thumb-knob 44d against which manual pressure may be applied in the event the solenoid fails for any reason to retract the spring 42 and release the brake mechanism, it being appreciated that the actual movement of the parts to braking position is preferably effected by the spring 42 upon de-energization of the motors, the solenoid 43 being arranged to retract the spring and release the brake mechanism when energized. Energization of the solenoid is effected only when the motors 20 are energized.

Rotation of the arm 45 about its pivot 49 in a counterclockwise direction (in reference to the brake operating assembly for one of the two motors 20, as shown in Fig. 7) will produce the desired movement of the braking plate 35 toward the braking plate 34, and the value of the thrust provided by the spring 42, taken with the lever arms represented by the location of the pivot 49 and the pads 47, will be so selected with respect to the braking surface area as to cause the brake members to firmly engage one another and stop the shaft 33 in a reasonably short time. Too severe a braking action, it will be appreciated, may impose inordinate inertia forces on the cables 4, and is to be avoided. The friction plates 36 and 37 are conveniently keyed to the shaft 33 through the agency of a plurality of bolts 50 mounted in a hub portion 51 on said shaft, and the shaft itself may float upon its bearings an amount sufficient to accommodate the braking movement resulting upon the plate assembly 36—37 as it is crowded against the fixed braking plate 34 by movement of the plate 35. The above-described braking means will be provided for each of the motor and drum assemblies, and a single spring and solenoid return mechanism will suffice to operate the two brake assemblies. In this connection, the provision of a compensating thrust assembly where the actuating thrust of the spring 42 is applied to the lever arms 45 is of particular advantage in that a substantially equal thrust may be attained upon each of the braking plates 35 in spite of a requirement that one of these plates might have to move more than the other as a result of a minor asymmetry in the positional adjustment of the parts.

Figure 8:
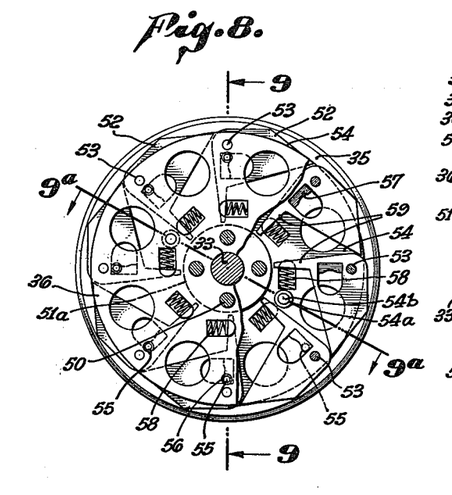
Figs. 8 and 9 are transverse and horizontal sectional views, respectively, of one of the brake elements for the motor shaft, Fig. 8 being taken along line 8—8 of Figs. 4 and 9 and Fig. 9 being taken on line 9—9 of Fig. 8, both of these figures showing the brake mechanism in non-braking condition.
Figure 9:
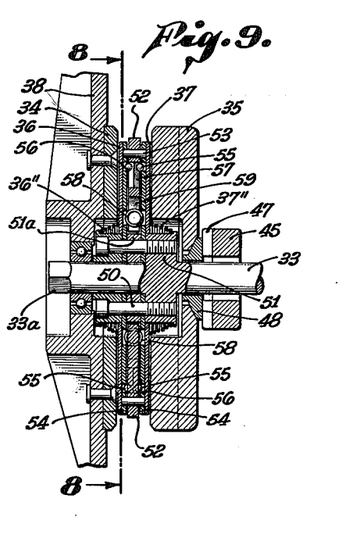

It is also preferable to provide a centrifugal braking structure which will prevent the motors 20 from overspeeding, particularly in the event the hoist is being operated without any load in place or where the device is being used to lower bombs away from the aircraft fuselage, and to this end I may utilize centrifugally responsive means for crowding the friction plates 36 and 37 into engagement with the braking plates 34 and 35, respectively. Such centrifugally responsive means may comprise a plurality of weights 52 pivotally secured as at 53 upon a pair of spaced support plates or discs 54 carried on the shaft 33 by the bolts 50. The weights 52 are adapted to cause the friction plates 36 and 37 to separate in an axial direction through the agency of small balls 55 carried in locating apertures 56 in the discs 54, which balls are adapted to be biased outwardly into engagement with the adjacent friction plates 36 and 37 through the agency of wedge means 57 on each of the weights 52. Biasing means are preferably provided for each of the weights 52 in position to oppose the rotation of the weights about the pivots 53 under the centrifugal force generated upon rotation of the structure, such as a plurality of springs 58 individually acting on arm portions 59 of the weights 52 inwardly of their pivotal mounting 53. The weights 52 are shown in Figs. 8 and 9 as being in a position such as not to exert any outward bias on the balls 55, wherefore the friction plates 36 and 37 are not biased outwardly against the braking plates 34 and 35, thus representing a rest, or unbraked condition for the structure. When the shaft 33 is rotated, the eccentric location of the pivots 53 with respect to the center of gravity of the weights 52 will cause such weights to be rotated individually in a counterclockwise direction about their respective pivots 53, against the resistance of the springs 58. During this rotation the wedge means 57 will crowd upon the friction plates 36 and 37, finally forcing the same against the braking plates 34 and 35 when a given rotational speed is attained, and producing a pronounced braking action on the rotation of the shaft 33 and consequently effecting a control of the rate of rotation of the motor shaft 21. Proper selection of the mass of the weights 52 and the strength of the springs 58 will determine the operating speed of the motors 20.

Figures 9A, 10:
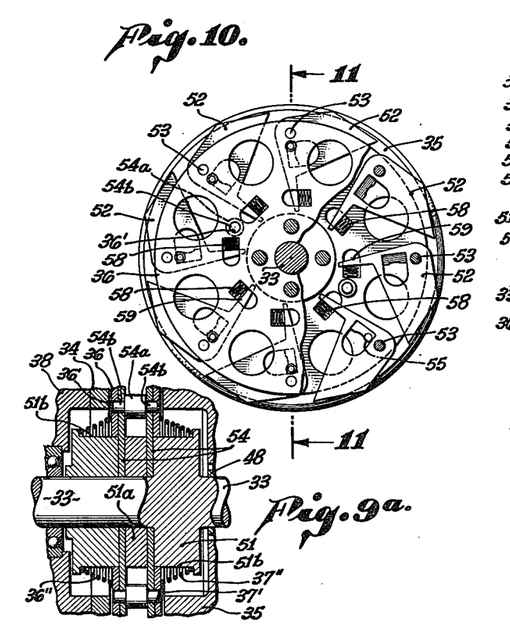
Fig. 9a is a sectional detail on line 9a—9a in Fig. 8.
Figs. 10 and 11 are views respectively corresponding to Figs. 8 and 9, Fig. 11 being taken on line 11—11 of Fig. 10, showing the brake element in braking condition.
Figure 11:
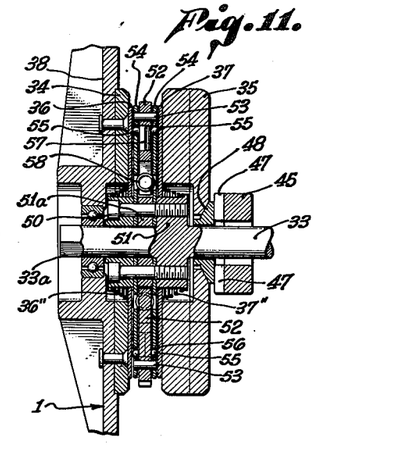

Referring more particularly to Figs. 9 and 9a, it will be seen that the support plates 54 are rigidly attached to the hub portion 51 of the shaft 33 by the attachment bolts 50, a spacer disc 51a being provided between the support plates 54 to maintain a desired axial separation thereof sufficient to provide operating space for the weights 52. The keying of the friction plates 36 and 37 to the shaft 33 is obtained through the agency of a pair of torque pins 54a having a central sleeve portion of an axial length equivalent to the axial length of the spacer disc 51a and projecting pin portions 54b extending through coacting openings in the adjacent plates 54 and slidably engaging within openings 36' and 37' in the adjacent friction plates 36 and 37, the projecting pin portions 54b being shorter than the combined thicknesses of the adjacent plates 54 and 37, for example, so as not to bear against the adjacent braking plates in the operation of the device. The friction plates 36 and 37 are preferably piloted on the outer periphery 51b of the hub portion 51, and compression springs 36" and 37" are preferably provided to bias the plates 36 and 37 toward the support plates 54 so that the friction plates will run free with respect to the adjacent braking plates unless they are positively forced against the braking plates by the action of the weights 52.

Figs. 12 and 13 illustrate one means which may be provided for supply of current to the motors 20, such as a concentric collector ring assembly 60 secured to the motor frame 61 and hence rotatable with the drum 2, against which a fixed collector ring assembly 62 is adapted to ride, one of the ring assemblies being preferably provided with conducting rings 63 which are spring-biased against the opposing rings 64. The fixed assembly 62 is mounted upon an end wall 65 of the framework, as through a bell 66, and this bell may be employed to support the rearward end of the drum 2, as through bearing 67. An O ring 77 is preferably provided at the end of the drum 2 against which the drum may turn, to act as a dust and oil seal. The rotational speed of the drum 2 being relatively low in the usual case (say on the order of 20 R. P. M.) this O ring seal will have a relatively long useful life.

Four rings for the collector ring assembly 60 are shown inasmuch as it is very desirable that the motors 20 be adapted for operation in both directions of rotation. Four leads 68 will be provided, the inner ends of which will be connected to the fixed collector ring assembly 62 (the connection not being shown in the drawings), and the leads may be carried to a junction box 69 to which the current supply conduit 70 connects. Similar leads will be provided to the motor of the other drum, and suitable housing portions may be provided in the end of the framework as at 71 through which the leads may extend. A suitable cover 72 may be provided for the junction box 69.

The circuit shown in Fig. 14 provides for control of the motors 20 through an "Up-Down" walking-beam switch structure 80 which may be located at some distance from the hoist, and connected thereto by the conduit 70 carrying five leads 70a–70e, for example. These leads may be identified as follows: 70a connecting to one side of the motor fields at terminal A; 70b connecting to one side of the armature windings of the motor 20 at terminal B; 70c connecting to the other side of the armature windings at terminal C; 70d connecting one side of battery 81 to the other side of the motor field windings and to the operating coil of the solenoid 43, at terminal D, and, 70e connecting to the other side of the solenoid coil at terminal E. The "Up" side of switch 80 is provided with a shunting member adapted to shunt leads 70a and 70b, and a shunt member applying the other side of battery 81 first to the other side of the solenoid coil and then to the opposite armature lead 70c. Similarly, the "Down" side of the switch 80 is adapted to shunt leads 70a and 70c and apply said other side of battery 81 first to the solenoid coil and then to the armature connection 70b. Connection of the solenoid coil to the battery slightly in advance of the energization of the motors lowers the initial load on the motors, as will be apparent.

I prefer to provide for mounting the lower ends of the support arms 14 at various positions on the framework 1 so as to accommodate bombs of different diameters, as described above, and to this end I may provide extension plates 73 on the framework to receive such support arms. A plurality of openings 74 may be provided on these extension plates at proper locations for the accommodation of bombs of different diameter, as may be seen from a comparison of Figs. 2 and 12, wherein the position of the spacing roller assembly 11 in Fig. 12 corresponds to the dot-dash position thereof shown in Fig. 2. The attachment of the arms 14 to the extension plates 73 at the position of the openings 74 may be accomplished through the agency of support pins 75 carried by knurled screw members 76 threadedly carried on the lower end of each of the arms 14. The change in position of the assembly 11 to accommodate bombs of different diameter is accomplished by backing off the screws 76 until the pins 75 are clear of their openings, moving the arms to the desired new location, and screwing the screws 76 back in place.

Where the hoisting mechanism is to be employed in hoisting objects which are not cylindrical, in which case the roller members 9 would not be particularly useful, any convenient form of platform may obviously be provided for the upper portion of the framework, but the rollers 9 are of particular utility where the device is to be used in the hoisting of bombs in order to facilitate the rotation of the bomb in the attachment thereof upon the support structure within the aircraft, it being usually desirable that the bomb be capable of rotation to facilitate the attachment of the bomb upon its supporting means.

Referring again to Figs. 1–3, it will be seen that the bomb is provided with a bomb shackle 82, latched upon a pair of attaching lugs 83. In the loading operation, a bomb is brought below the position of the bomb rack upon which it is to be mounted, as through the agency of a dolly or car, and the hoisting mechanism of this invention is placed below the center of gravity of the bomb. The cables 4 will have previously been attached to the cross member 5 in the aircraft, with the lengths thereof preferably equalized to arrange the loops 3 thereof at the same level. The loops 3 are then placed upon the shoulder means 17 on each of the drums 2, and the "Up" knob of the switch 80 depressed. This will rotate the drums 2 to carry the loops around the drums and take up the slack in the cables 4. The arms 14 will have been adjusted to place the spacing roller assemblies 11 in proper position to cause the cable runs to clear the sides of the bomb being elevated, and the hoist may be raised into engagement with the bomb. The location of the center of gravity of the bomb is readily ascertainable by reference to the markings provided thereon, and it is an easy matter to locate the hoist so that the cables are spaced equally fore and aft of this marked location. As the hoist is operated further, the drums wind the cables up upon the helical grooves 18 and 19, and the fore-and-aft separation of the cables increases as the winding progresses, increasing the stability of the structure as the load is elevated. When the desired elevation has been attained, the bomb may be rotated on the rollers 9 to bring the shackle 82 in position to engage the rack 10, and the hoist may then be lowered away, paying out the cables 4 during its descent. A bomb which has been loaded is indicated at $B_1$ in Fig. 3, with the hoist loaded with a second bomb $B_2$ ready to be carried into place. Owing to the fact that the hoist rises along the cables, with no movement of the cables themselves, the cable runs may be extended right alongside or in contact with the bomb or bombs already loaded or with the bomb rack itself, without any relative movement which might be objectionable from the standpoint of disturbing the position of the bomb, wear on the cables, etc.

It will be noted that the ends of the shafts 33 which project beyond the wall member 38 are squared off, as at 33a. This construction is provided so that when a load of greater weight than that which can be hoisted by a single hoisting device of the type shown above, two similar hoisting devices may be arranged under a load with their wall members 38 facing one another, and a coupling member provided between the adjacently disposed shaft members 33, in engagement with the portions 33a, so that the two hoisting devices may be operated as an integral unit. In such a use, it will be apparent that it is very desirable that the electrical switching mechanisms for the two devices will be operated in synchronism.

Figures 15, 16, 17:
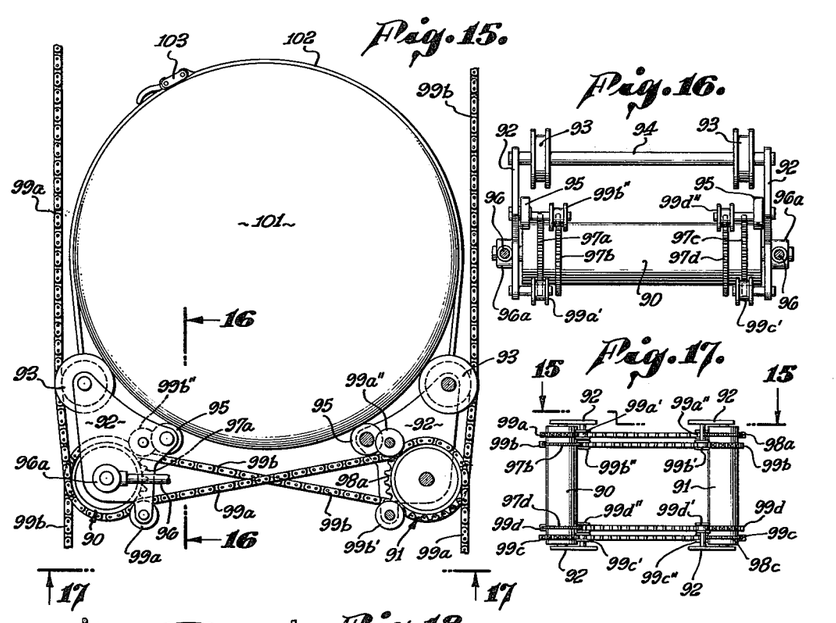
Fig. 15 is a view corresponding generally to Fig. 2, but only partly broken away at the right-hand side, as per line 15—15 in Fig. 17, and showing a modified form of my hoisting device.
Fig. 16 is a longitudinal section thereof as taken on line 16—16 of Fig. 15.
Fig. 17 is an inverted plan view, on reduced scale, as taken on line 17—17 in Fig. 15.

In Figs. 15 through 17 I have illustrated a modified form of hoist which is adapted to engage upon a plurality of flexible hoisting lines of the character of roller chains, instead of cables as shown in connection with the first form of the invention. This device is generally comparable to the first form of the invention in the provision of a pair of rotatable drum members 90 and 91, which are mounted on separate frame members 92 to form a right- and left-hand pair of hoisting elements each provided with a spacer pulley structure 93 (corresponding to those shown at 12 and 16, above) interconnected by a cross support 94. The two hoisting elements are preferably interconnected at their ends, as through a cross support 96 pivotally attached to the hoisting elements as at 96a. Each of the hoisting elements is provided with a pair of longitudinally spaced support rollers 95, corresponding in function to the rollers 9 in the first-described form of the invention, the load of the bomb being distributed between the spaced pulleys 93 and the support rollers 95. The pivotal attachment of the hoisting elements provides for rotational adjustment in the position of the elements to enable the spacer pulleys 93 and support rollers 95 to uniformly engage upon the load. The flexible hoisting lines are preferably four in number, and means are provided on the drum members 90 and 91 to engage these hoisting members, such means comprising, for example, a plurality of sprockets 97a, 97b, 97c, and 97d on the drum 90 and a similar set of sprockets 98a–98d on the element 91. The flexible hoisting lines may comprise roller chains 99a through 99d.

As illustrated in Figs. 15 through 17, the hoisting elements 90 and 91 are adapted to underlie the load represented by the bomb 101, the elements being preferably clamped to the bomb through the agency of a hold-down strap structure shown at 102, provided with releasable latch means 103. The chains 99a–99d may be threaded between the two elements 90 and 91 so as to interlock them for concurrent rotation, as by passing the near left-hand chain 99a over the spacer pulley 93 thence under the drum 90 on sprocket 97a thence over a guide roller 99a', thence over toward the drum 91 under a guide roller 99a'' into engagement with the sprocket 98a on the drum 91 and thence downwardly as a free end. At the near right-hand side of the structure (Fig. 15), the chain 99b is similarly brought over the spacer pulley 93, thence under drum 91 (on the sprocket which is adjacent the sprocket 98a in alignment transversely with sprocket 97b shown in Fig. 16), thence under guide roller 99b', thence toward the drum 90 and under guide roller 99b'' onto the sprocket 97b, thence over the top of drum 90 and downwardly as a free end. The chains 99c and 99d at the far end of the structure (Fig. 15) will similarly be threaded over the sprockets at the other end. The cross-lacing of the chains will interlock the two drums 90 and 91, and cause the respective hoisting elements to climb or descend upon the chains equally upon energization of the driving means, which may comprise motor means provided within the respective drums after the manner shown in connection with the first-described form of the invention. Suitable brake means will preferably be provided, corresponding in function to the brake means shown above.

Figure 18:
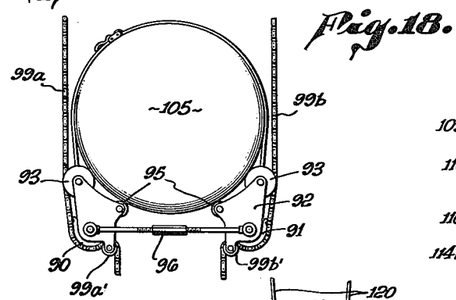
Fig. 18 is a view corresponding to Fig. 15, but on smaller scale, showing an alternative manner in which the flexible hoisting lines (chains, for example) may be threaded through the device so as to enable separate operation of the two hoisting drum members.

In Fig. 18 I have illustrated the structure of the Figs. 15–17 with an alternative threading of the roller chains 99a–99d, in which the chains are merely brought past the spacer pulleys 93 thence under the respective drums 90 and 91 and over the aligned guide rollers 99a'–99d' and thence downwardly as free ends. This method of threading establishes each of the hoisting elements as an independent device, and separate electrical control connections to the respective driving motors may be provided to enable separate control thereof. The separate operation of these motors enables a minor rotation of the bomb 105 by operating either of the hoisting elements independently, to facilitate the attachment of the bomb in the bomb rack under conditions where such rotational movement is desirable.

Figure 19:
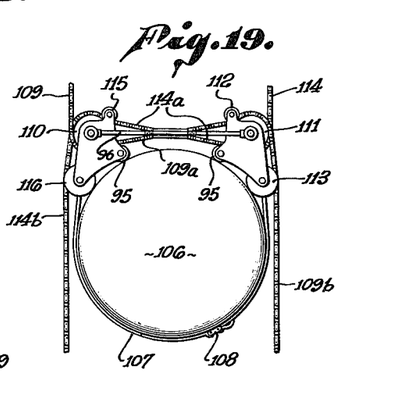
Fig. 19 corresponds to Fig. 15, and illustrates how the form of Fig. 15 may be arranged above the load, if desired.

In Fig. 19 I have illustrated the structure of Figs. 15–17 arranged to carry the load, such as a bomb 106, slung below it, such load being secured to the structure through the agency of holding strap means 107 provided with releasing latch means 108. In this arrangement the hoisting chains are brought under the respective drums thence across to the opposite drum after the fashion of Fig. 15 but in an inverted relation. The chain 109, for example, is brought under the left-hand drum 110 thence across as at 109a to the adjacent drum 111 under the guide roller 112 thence downwardly over the spacer pulley 113 as at 109b. Similarly the opposite side chain 114 is brought under the drum 111 on its sprocket thence across to the other drum 110 as at 114a, under the guide roller 115 thence over the spacer pulley 116 as at 114b. In use, an arrangement such as shown in Fig. 19 would be lowered onto a bomb on its truck, the attaching means 107 and 108 carried under the bomb and secured, and the bomb then lifted without requiring removal and rethreading of the chains over their respective sprockets on the drum members 110 and 111.

Figure 20:
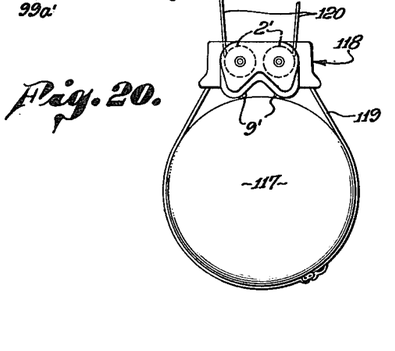
Fig. 20 shows an arrangement of a hoist of the general type shown in Fig. 1 above the load after the fashion of Fig. 19.

In Fig. 20 I have illustrated the adaptation of the form of hoist means shown in Figs. 1 through 13 in the relation illustrated in Fig. 19, in which a bomb 117 is secured to a hoisting device 118 through an attaching strap structure 119 which may cause the support rollers 9' of the hoisting device to be brought into engagement with the bomb. The hoisting cables 120, corresponding to the cables 4, are engaged by the hoisting drums 2' in a manner comparable to that described above, it being apparent that the attaching lug or shoulder means provided on the drums 2' for the function provided by the shoulder means 17 in the first form of the invention will be oppositely directed with respect to the showing in the first form of the invention, if it is desired to have the cables 120 engage at a maximum lateral separation. If the cables 120 are caused to engage at the opposing peripheries of the drums 2' a shoulder structure such as shown at 17 may be employed without change.

It is to be expected that others skilled in the art will conceive adaptations of my structure which depart from the specific showings herein set forth, and for this reason I do not consider my invention as limited specifically to the illustrative examples herein disclosed, but rather to the scope of the subjoined claims.

I claim:

1. A hoisting device adapted to move with a load, which comprises: a framework adapted to carry the load and movable therewith; a pair of hoisting drums rotatably disposed on said framework with their axes parallel; electric motor means disposed internally of each of said drums and having an operating shaft coaxial therewith; gear means connecting said shafts to the respective drums and including means interconnecting said drums for only equal concurrent rotation in opposite directions; and brake means on at least one of said operating shafts and including centrifugally responsive brake-elements adapted to cause said brake means to exert braking action upon said shafts upon rotation thereof at a predetermined rate.

2. A hoisting device adapted to move with a load, which comprises: a framework adapted to carry the load; a pair of hoisting drums rotatably disposed on said framework with their axes parallel; electric motor means disposed internally of each of said drums and provided with a drive shaft coaxial of the drum and rotatably mounted on the framework; gear means drivingly connecting each of said drive shafts to their respective drums and to each other; brake means for each of said drive shafts including cooperating brake members mounted on said framework and on each of said drive shafts; separate operating means for the brake means on each of said drive shafts; and actuating means for simultaneously actuating both said brake operating means.

3. A hoisting device adapted to move with a load, which comprises: a framework adapted to carry the load and move therewith; a pair of hoisting drums rotatably disposed on said framework with their axes parallel; electric motor means disposed internally of each of said drums and having an operating shaft coaxial therewith; gear means connecting said shafts to the respective drums, said gear means including means interconnecting said drums for only equal concurrent rotation in opposite directions; brake means on each of said operating shafts movable into and out of the braking position with respect thereto and including centrifugally responsive brake elements adapted to cause said brake elements to exert braking action upon said shafts upon rotation thereof at a predetermined rate; solenoid controlled operating means for both said brake means; and circuit means for said solenoid operating means and said motors for simultaneously moving both said brake means out of the braking position upon energization of said motors and into braking position upon deenergization of said motors.

4. A hoisting device adapted to move with a load, which comprises: a framework adapted to carry the load and movable therewith; a pair of hoisting drums rotatably disposed on said framework with their axes parallel; electric motor means disposed internally of each of said drums and having an operating shaft coaxial therewith; gear means connecting said shafts to the respective drums and including means interconnecting said drums for only equal concurrent rotation in opposite directions; and means on each of said drums defining shoulder means arranged at opposite ends of a medial section of the drum periphery, said shoulder means being adapted to receive a cable loop for attachment of such cable to the drum.

5. A construction as set forth in claim 4, said drums being each provided with helically extending cable-receiving grooves, extending toward the respective ends of the drums from adjacent said shoulder means, the helically extending grooves at the opposite ends of each drum being of opposite hand.

6. A bomb hoisting device adapted to lift a load of generally circular cross section, comprising: a frame adapted to carry the load and movable with the load; a pair of rotatable hoisting members mounted on the frame beneath and entirely within the lateral limits of the load thereon with their axes parallel to each other and to the longitudinal axis of the load, said members being adapted to engage statically supported flexible hoisting lines which carry the weight of the load and the hoisting device; means for rotating the hoisting members mounted on the frame; a pair of idler rollers; and roller supporting means attached to the frame and supporting the rollers one at each side of the load and beyond the lateral limits of the frame in position to engage and guide the hoisting lines below the maximum lateral extent of the load whereby the hoisting lines pass vertically upward from the idler rollers closely adjacent the lateral limits of the load at the position of maximum extent.

7. A bomb hoist as in claim 6 in which the support means for the idler rollers is adjustably mounted on the frame at different positions to accommodate loads of different diameters.

8. A bomb hoist as in claim 6 which also comprises load engaging members coaxially mounted with the idler rollers, the load engaging members each being a flange of larger diameter than and located at one end of an idler roller and independently rotatable with respect thereto and being held against the load by pressure of a hoisting line on the associated idler roller.

9. A bomb hoisting device adapted to lift a load of generally circular cross section, comprising: a frame adapted to carry the load and movable with the load; a pair of rotatable hoisting members mounted on the frame beneath the load thereon with their axes parallel to each other and to the longitudinal axis of the load, said members being adapted to engage statically supported flexible hoisting lines which carry the weight of the load and the hoisting device; means for rotating the hoisting members mounted on the frame; a pair of spaced inner load supporting members rotatably mounted on the frame to rotate about axes parallel to the longitudinal axis of the load; and a pair of outer idler rollers one at either side of the load and beyond the lateral limits of the frame in position to engage and guide the hoisting lines below the lateral limits of the load whereby the hoisting lines pass vertically upward from the idler rollers adjacent the lateral limits of the load and the load can be rotated in place on the frame.

10. A bomb hoisting device adapted to lift and move with a load, which comprises: a pair of rotatable hoisting members each provided with cable engaging means; frame means adapted to be disposed in supporting relation to the load to be hoisted, said frame means interconnecting and locating said hoisting members with their axes of rotation in spaced parallel relation to each other and to the longitudinal axis of the load; a pair of hoisting cables each having a loop removably engaged by said cable engaging means on one hoisting member with the ends of the cable statically supported and extending upwardly to carry the weight of said load and the hoisting device and to cause the same to be raised upon rotation of said hoisting members, the free ends of each cable being located at one side of the load and spaced apart axially thereof; means interconnecting said hoisting members for equal concurrent rotation only; and means for rotating said hoisting members.

11. The combination set forth in claim 10 which also includes gear means interconnecting the hoisting members for equal rotation in opposite directions.

12. A bomb hoisting device adapted to lift and move with a load, which comprises: a pair of rotatable hoisting members; sprocket means attached to each hoisting member; frame means adapted to be disposed in supporting relation to the load to be hoisted, said frame means interconnecting and locating said hoisting members with their axes in spaced parallel relation to each other and to the longitudinal axis of the load; flexible chain members statically supported at their upper ends for supporting the weight of said load and hoisting device, the chain members engaging sprocket means on both hoisting members whereby said hoisting members are rotated equally and concurrently; and means for rotating said hoisting members.

13. A bomb hoisting device for use in conjunction with an airplane, comprising: a frame adapted to carry the load and movable with the load; a pair of rotatable hoisting drums mounted on the frame beneath and within the lateral limits of the load thereon with their axes parallel; electric motor means disposed internally of each drum and provided with a drive shaft coaxial of the drum; and gear means driven by each shaft for operatively connecting the motor shaft to its associated drum, the two gear means including continuously intermeshing elements positively interconnecting said drums for limiting the drums to equal concurrent rotation in opposite directions.

14. A bomb hoist as in claim 13 in which each motor means has a field structure connected to and rotating with the drum, and a drive shaft rotatably mounted on the frame and carrying an armature rotatable relative to the field structure.

15. A bomb hoisting device for use in conjunction with an airplane, comprising: a frame adapted to carry the load and movable with the load; a pair of rotatable hoisting drums mounted on the frame beneath and within the lateral limits of the load thereon with their axes parallel; flexible hoisting line means operatively attached to each drum having two vertically extending runs spaced longitudinally of the drum with the upper end of each run of the lines adapted for static connection to the airplane to support the load and hoisting device; electric motor means disposed internally of each drum and provided with a drive shaft coaxial of the drum; and similar gear means driven by each shaft for operatively connecting the motor shafts to their respective drums, the two gear means including intermeshing elements positively interconnecting said drums for limiting the drums to equal concurrent rotation in opposite directions.

16. A bomb hoist as in claim 15 that also includes means for maintaining constant the spacing between runs at opposite sides of the load, the spacing being substantially equal to the width of the load carried.

17. A bomb hoisting device for use in conjunction with an airplane, comprising: a frame adapted to carry the load and movable with the load; a pair of rotatable hoisting drums mounted on the frame beneath and within the lateral limits of the load thereon with their axes parallel; flexible hoisting line means operatively attached to each drum having two vertically extending runs spaced longitudinally of the drum with the upper end of each run of the lines adapted for static connection to the airplane to support the load and hoisting device; electric motor means carried by the device for rotating the drums; and drive means drivingly connecting the motor means to both drums and provided with intermeshing gear elements positively interconnecting the drums for limiting the drums to equal concurrent rotation in opposite directions.

CHARLES J. ULRICH.

REFERENCES CITED

The following references are of record in the file of this patent:

UNITED STATES PATENTS

| Number | Name | Date |
| --- | --- | --- |
| 604,802 | Stewart et al. | May 31, 1898 |
| 810,384 | Pilling | Jan. 23, 1906 |
| 1,288,137 | Newhall | Dec. 17, 1918 |
| 1,507,822 | Frame | Sept. 9, 1924 |
| 1,775,236 | Corcoran | Sept. 9, 1930 |
| 1,950,057 | Lange | Mar. 6, 1934 |
| 2,355,341 | Trimbach | Aug. 8, 1944 |
| 2,362,676 | Stechbart | Nov. 14, 1944 |
| 2,411,647 | Bonnell et al. | Nov. 26, 1946 |
| 2,450,718 | Darnell | Oct. 5, 1948 |

FOREIGN PATENTS

| Number | Country | Date |
| --- | --- | --- |
| 761,158 | France | Sept. 24, 1932 |
| 501,302 | Great Britain | Feb. 24, 1939 |